Aug. 22, 1950
E. D. JANES
2,519,965
CAPPED PRONG RING
Filed Aug. 22, 1945
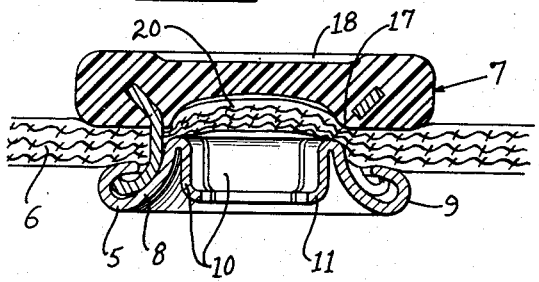
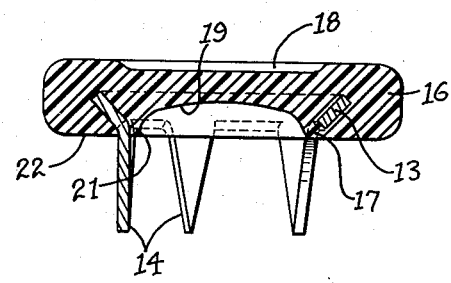
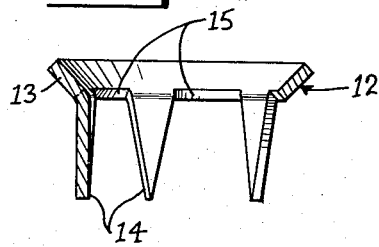
INVENTOR.
Edmund D. Janes.
BY Patented Aug. 22, 1950

2,519,965

UNITED STATES PATENT OFFICE 2,519,965

CAPPED PRONG RING

Edmund D. Janes, Waterbury, Conn., assignor to Scovill Manufacturing Company, Waterbury, Conn., a corporation of Connecticut Application August 22, 1945, Serial No. 612,001

3 Claims. (Cl. 24—216)

This invention relates to prong rings used in securing snap fasteners and similar devices to supports. More particularly, the invention deals with prong rings employing die cast or molded caps securely anchored upon a flared mounting end portion of a prong ring and, further, shaped to provide clearance for stud or other members adapted for attachment to the fastener device or devices in question.

The novel features of the invention will be best understood from the following descriptions, when taken together with the accompanying drawing, in which certain embodiments of the invention are disclosed and, in which, the separate parts are designated by suitable reference characters in each of the views and, in which:

Fig. 1 is a sectional view through a capped prong ring illustrating one use of the ring in securing a fastener device to a support.

Fig. 2 is a sectional view of the capped prong ring detached and with the prongs of the ring extending in normal position; and Fig. 3 is a sectional view through the prong ring prior to attachment of the cap therewith.

For purposes of illustrating one adaptation and use of my invention, I have shown, in Fig. 1 of the drawing, at 5, a fastener device in the form of a socket member of a snap fastener, which is adapted for attachment to a supporting sheet 6 of cloth or other suitable material by one of my improved capped prong rings 7.

In the construction shown, the socket member 5 comprises an annular downwardly extending and outwardly curved wall portion 8, often referred to as a breast wall, this wall terminating at its lower end in an upwardly extending and inwardly curved annular flange 9, spaced with respect to the wall 8. Extending continuously from the upper end of the wall 8 are a plurality of circumferentially spaced and downwardly extending spring fingers 10, having inwardly offset flanges 11 at their free ends, the latter being adapted to engage the ordinary stud member of a snap fastener, not shown, in retaining the stud and socket parts against displacement.

The capped prong ring comprises a prong ring 12 of the structure generally shown in sectional detail in Fig. 3 of the drawing. This ring comprises an annular outwardly flared ring or wall portion 13, from the lower end of which extends a plurality of circumferentially spaced prongs 14. The cut-out portions 15, between the prongs 14, extend into the ring 13 sufficiently to form, in the cast or molded cap 16, anchorage or key portions, as at 17, at the right of Figs. 1 and 2 of the drawing. These anchorage portions are disposed in the cut-outs 15 and serve to retain the cap 16 against rotation on the ring 13.

The cap 16 may be of any peripheral form and contour and, further, may be characterized as, for example, by a depression 18 in the outer surface thereof to give appearance or marks of identification to the cap. The cap 16 is of a thickness materially greater than the width of the ring 13, so that the ring 13 is actually embedded in the lower portion only of the cap and centrally with respect to the periphery of the cap. The lower surface of the cap, within the ring 13, has a deep recess or chamber 19, which allows the material of the mounting 6 to extend into the cap, as seen at 20, in Fig. 1 of the drawing, to give ample clearance within the socket 5 for the reception of the companion stud or other fastener member, not shown.

It will also appear, from a consideration of the left side of Fig. 2, that the material of the cast or molded cap body 16 extends onto the inner surface of the prongs 14, between the cut-outs 15, as seen at 21. It will, therefore, appear that the entire ring 13 becomes completely embedded in the cap body 16 and the prongs 14 alone will protrude from the lower surface 22 of the cap. These prongs normally are in the arrangement shown in Fig. 2 of the drawing and, in attachment of the socket 5 with the support 6 by the capped prong ring, the prongs 14 pierce the support 6 and are flared outwardly in their movement over the wall 8 and are anchored in the interned annular flange 9 of the socket, as clearly seen in Fig. 1.

The cap or cap body 16 may be formed of any desired die cast or molded material and, in illustrating the present invention, this cap body is indicated as composed of plastic material, it being apparent that any of the thermosetting or thermoplastic types of plastic materials can be used. In some instances, however, the cap body 16 may be formed of metal, particularly where greater strength and service is required and where lightness and ornamentation are sacrificed to gain strength and durability. In other words, it will depend largely on the use to which the fastener is applied.

It will be understood that, by reason of the outward flare of the ring 13, the prong ring is securely retained against pull-apart separation from the cap body 16 and, furthermore, the anchorage or key portions 17 also retain the prong ring against rotary movement in the cap body.

In producing capped prong rings of the kind defined wherein the cap comprises a molded body, it will be apparent that the prong ring can be standardized particularly with respect to sizes and, on these standardized rings, caps of any desired shape or contour can be produced and in materials or combinations of materials desired. This construction lends itself to the production of caps having trade-marks, designs or other characteristics suiting the customer, distributor or user of the devices.

Having fully described my invention, what I claim as new and desire to secure by Letters Patent is:

1. A capped prong ring comprising a plastic cap body, an annular wall completely embedded in said body, a plurality of prongs spaced circumferentially on and projecting from one edge of the wall and protruding from said cap body, and said wall being flared outwardly in anchoring said prongs against displacement from the cap body.

2. The combination with a prong ring comprising an annular outwardly flared ring portion with circumferentially spaced prongs projecting from one edge of said ring portion, of a one-piece cap body completely enveloping the ring portion of said prong ring, the prongs of said ring protruding from one surface of said cap body, said surface of the cap body having within and spaced from the prongs a recess opening through said surface, and that part of the cap body overlying said edge of the ring portion intermediate the prongs forming key members retaining the prong ring against rotation in the cap body.

3. A pronged fastener member comprising a one-piece cap body, upper and lower surfaces of said body having recesses, a plurality of prongs projecting from one of said surfaces with the prongs spaced outwardly and circumferentially with respect to the recess in said surface, said prongs extending into the cap body, and means joining the prongs within said body and entirely embedded within the cap body for anchoring the prongs against displacement from said body.

EDMUND D. JANES.

REFERENCES CITED

The following references are of record in the file of this patent:

UNITED STATES PATENTS

| Number | Name | Date |
|---|---|---|
| 556,635 | Kempshall | Mar. 17, 1896 |
| 568,687 | Kempshall | Sept. 29, 1896 |
| 656,412 | Merrill | Aug. 21, 1900 |
| 910,861 | Richards | Jan. 26, 1909 |
| 2,164,336 | Chalfin | July 4, 1939 |
| 2,327,554 | Purinton | Aug. 24, 1943 |